3,483,006
CEMENTITIOUS COMPOSITION, PRODUCTS MADE THEREFROM, AND PROCESS OF MAKING AND USING THE SAME
Anatole N. Vassilevsky, 1421 Madison Ave., New York, N.Y. 10029, and Theodore Bostroem, Park Road Ext., Middlebury, Conn. 06762
No Drawing. Filed Dec. 27, 1965, Ser. No. 516,718
Int. Cl. C04b 35/22, 35/16, 9/04
U.S. Cl. 106—74          12 Claims

ABSTRACT OF THE DISCLOSURE

The cementitious composition of the invention is composed of magnesium oxide or semicalcined dolomite, magnesium sulfate, an alkaline earth metal chloride, an alkali metal silicate, and an alkali metal fluorosilicate in specific proportions. Slurrying with water causes setting and hardening of the mixture whereby a water insoluble complex is formed. Filler materials may be added. The resulting products are useful building and construction materials, such as boards, panels, walls, and others.

---

This invention relates to a cementitious composition and more particularly to a cementitious composition of the type used in the building fields and to a process of making and using same.

Conventional cementitious compositions may be divided into two groups, to wit: organic cements and inorganic (or mineral) cements.

The cementitious composition of the first group, i.e. the organic ones, while showing the advantage of a comparatively low weight per volume unit, are expensive and exhibit poor resistance to the effects of variations in atmospheric conditions as well as poor fire resistance. These organic compositions cannot be used for manufacturing, for instance, building and construction elements for constructing prefabricated houses, or roofing materials. In fact, they can only be used for interior finishes, for instance, in connection with paints and putties. One of the important reasons for this limitation is the fact that these organic compositions are affected unfavorably by the rays of the sun.

The best known and widely used cementitious composition of the second, inorganic or mineral group, is portland cement, used for preparing conventional concrete. Among other drawbacks concrete shows a high weight per unit of volume. It will not properly bind organic matter and its use is also limited as to the nature of mineral fillers. Concrete will not bind a filler containing, for instance, top soil and clay. The water for mixing portland cement must be physically and chemically clean, i.e. substantially free of salts and acids which unfavorably affect setting of the concrete and the properties of the set concrete. Rock, gravel, and sand used for portland cement concrete must be "washed" and free of impurities such as humus, clay, certain salts, and others. As to using sea water with portland cement, this is out of the question.

There exist also certain special cements, based on magnesium oxychloride and oxysulfate, i.e. the so-called "Sorel" type, which will readily and firmly combine with organic filler materials and the like, such as saw dust, wood shavings, straw, etc. Such Sorel cements have been known for many years but have not fulfilled the hopes of their inventors because of several drawbacks of a theoretical and practical nature, as will be described hereinafter.

Theoretically, they are prepared by mixing two solid components in exact proportions and immediately thereafter admixing thereto an exact amount of water which varies according to the formulations developed. Thereafter, the organic filler material may be added. However, due to instability of the amount of water of crystallization of the magnesium salts, for instance, for magnesium chloride about 6 moles of water, the approved practice of manufacturing such a cement consists in first preparing a concentrated aqueous solution of the salt of a predetermined salt content. Thereafter, the exact required amount of the other reaction component is determined and both components are mixed with each other. It is obvious that, while this may readily be done in the laboratory and possibly also in a factory, this is far from being a practical possibility under field conditions.

Even when operating under optimum conditions, the resulting building materials obtained with this type of cement are either hygroscopic as the "Sorel" type cements based on magnesium oxychloride or they are porous and brittle as the "Steward" type cements based on magnesium oxysulfates.

In addition thereto even minute deviations from the exact formula cause a substantial decrease in the mechanical strength properties of the final product. As mentioned, the industry and the building trade have not accepted such cements except for specific uses.

It is one object of the present invention to provide a novel and highly valuable cement which is capable of binding any type of organic and inorganic filler material without requiring complicated manufacturing procedures as described above for the "Sorel" or "Steward" type cements. The novel cement according to this invention can readily be used like portland cements, i.e. by simply mixing a single powder with water. In addition, the novel cement is not affected by variations in the purity of the slurrying water so that even sea water can be used.

Another object of this invention is to provide a cementitious composition which, when properly mixed with water and filler material, will produce a building material which shows no undesirable hygroscopicity and no detrimental porosity and brittleness, even when large amounts of organic or other filler materials are admixed thereto.

A further object of this invention is to provide a cementitious composition which is not at all or only to an insignificant degree affected by even considerable variations in the proportions of its components, which is also not substantially affected by variations in the proportion of cement to water and likewise practically insensitive to the degree of purity of the water.

Still another object of this invention is to provide a cementitious composition which is a mechanical mixture of dried and calcined chemical compounds which, in the absence of water, can be stored indefinitely in a finely pulverized and homogenized form and which needs only to be mixed with water and, if desired, with the appropriate filler material to exhibit all the advantageous properties of the finished building material as outlined above.

A further object of this invention is to provide a cement which exhibits excellent mechanical strength properties and which, even when having incorporated thereinto combustible filler material, will produce a substantially noninflammable building materials.

The novel cementitious composition according to the present invention has the further advantage that its components are chosen in such a manner that, when they are mixed with water, their reaction is exothermic. This property of the novel cementitious composition accelerates considerably the setting and hardening process thus being similar in its natural behavior to conditions which are presently encountered only when using heated molds.

In principle, the cementitious composition according to the present invention comprises two complex substances the one component being a magnesium-calcium-oxychloro-sulfate, i.e. composed of MgO, $MgSO_4$, and $CaCl_2$, and the other one being composed of calcium chloride, an alkali metal fluorosilicate, and an alkali metal silicate, i.e. composed of $CaCl_2$, $Na_2SiF_6$, and $Na_2SiO_3$.

When the above-mentioned ingredients forming these complex substances are mixed with each other, preferably in a calcined or dried state, the resulting mixture remains chemically stable for an unlimited period of time until, shortly before use, the slurrying water is added to said mixture to produce a cementitious slurry which will solidify, whereby reactions and regrouping of the cations and anions of the ingredients take place in the slurry. The following formulas may characterize the composition of the dry cementitious preparation of this invention:

(a) First mixture:

$$m(MgO) + n(MgSO_4) + p(CaCl_2)$$

(b) Second mixture:

$$q(CaCl_2) + r(Na_2SiO_3) + s(Na_2SiF_6)$$

Addition of water to the mechanical mixture of said components will cause the chemical reaction to start the cations and anions to regroup, thus resulting in the formation of a single complex compound which possesses valuable properties. Surprisingly this new complex compound is substantially insoluble in water in contrast to the water-solubility of its constituents (with the exception of magnesium oxide), but possesses all the desirable properties mentioned hereinabove.

The insolubility of the set mixture proves that all its water soluble constituents have participated in the formation of the complex compound. It becomes impossible, once the reaction is completed, to separate the starting ingredients therefrom.

Calcined magnesite (MgO) may be replaced by dolomite composed of magnesium carbonate and calcium carbonate which has been subjected to calcination at a temperature high enough to decompose the magnesium carbonate to carbon dioxide and magnesium oxide but not high enough to also decompose the calcium carbonate. Such partial calcination may be designated hereinafter as "semicalcination."

The amount of semi-calcined dolomite to replace the magnesium oxide is selected so as to yield an amount of magnesium oxide which corresponds to the amount of calcined magnesia used. The remaining, co-calcined calcium carbonate does not participate in the final reaction and serves as filler material. It has no effect on the resulting building material except that it causes a slight increase in its specific gravity.

Thus, when using dolomite in place of magnesium oxide, the following formulas represent the cementitious material of the present invention:

(a) First mixture:

$$m(MgO) + m_x(CaCO_3) + n(mgSO_4) + p(CaCl_2)$$

(b) Second mixture:

$$q(CaCl_2) + r(Na_2SiO_3) + s(Na_2SiF_6)$$

Such a mixture can also be stored indefinitely as long as no water is added thereto.

Although the composition of the cement according to the present invention may vary, excellent results are achieved when the quantitative coefficients $m$, $n$, $p$, $q$, $r$, $s$ are selected in such a manner that the ratio $m:p$ is between about 10:1 and about 10:3 and the ratio $q:r$ is between about 3:8 and about 1:8 while the ratio $r:s$ is between about 9:2 and about 7:2. The amounts of the components MgO, $MgSO_4$, and $CaCl_2$ composing a first mixture and of the components $CaCl_2$, $Na_2SiO_3$, and $Na_2SiF_6$ composing a second mixture which first and second mixtures are mixed to yield the cementitious composition according to the present invention, are preferably selected so that the ratio $n:r$ is between about 1:1 and about 3:1.

The magnesium oxide is present in the first mixture in an amount between about twice as high and about two thirds as high as that of the sum of the other two components of said mixture.

The magnesium sulfate is preferably present in the first mixture in an amount between about one third and about four times as high as that of the calcium chloride.

The calcium chloride is preferably present in the second mixture in an amount between about one tenth and about three tenths of the amount of the sum of the other two components of said mixture.

The sodium silicate is preferably present in the second mixture in an amount about four times as high as that of the sodium fluoro-silicate.

The components of these mixtures may be finely comminuted and dried before compounding them. They may also be comminuted and/or dried during mixing to the final composition.

The filler material is preferably admixed to the cementitious composition in an amount between about half the amount and about four times the amount of the cementitious composition.

The water used for slurrying the cementitious composition with or without filler addition is preferably added in an amount about equal to and about half of the amount of the cementitious composition depending upon the components of said composition and the filler material employed.

The following examples serve to illustrate the present invention without, however, limiting the same thereto, whereby all parts given therein are parts by weight.

Example 1

Ten parts of calcined magnesite (MgO) are mixed with 7 parts of calcined or well dried magnesium sulfate ($MgSO_4$) and with 2 parts of anhydrous calcium chloride ($CaCl_2$). The components are finely ground and homogenized by thorough mixing. This mixture is designated as mixture "A."

One part of calcined calcium chloride ($CaCl_2$) is mixed with 8 parts of sodium silicate ($Na_2SiO_3$) previously dried at about 250° C., and with 2 parts of similarly dried sodium fluorosilicate ($NaSiF_6$). This mixture which is also finely ground and homogenized is designated as mixture "B."

Three parts of mixture "A" and 1 part to 2 parts of mixture "B" are then mixed together and homogenized. The resulting mixture, which is a whitish powder, is a representative example of the cementitious composition of the present invention.

When mixing 10 parts thereof with 8 parts of water, the mixture sets and hardens in a suitable mold without supplying heat, within a few hours whereafter the resulting article can be removed from the mold. Complete setting and hardening takes place within about five days, i.e. within a fraction of the time required for concrete based on portland cement. This is mainly due to the exothermic character of the reactions which take place in the setting and hardening process.

Example 2

Twenty parts of partly calcined dolomite ($MgO \cdot CaCO_3$) are mixed with 6 parts of calcined magnesium sulfate ($MgSO_4$) and with 2 parts of anhydrous calcium chloride ($CaCl_2$). This mixture is designated as mixture $A_1$.

Three parts of said mixture $A_1$ and 2 parts of the mixture B of Example 1 are thoroughly mixed with each other and finely ground. Then parts of the resulting mixture, on admixing 6 parts of water thereto, yield an aqueous slurry which sets and hardens in a suitable mold within about 7 days.

The resulting building material such as blocks, bricks, plates, tiles and the like meets all the requirements of the building trade as explained above and, in addition thereto, shows excellent mechanical strength properties.

Furthermore, it has been found that, due to the nature of the complex reactions taking place on setting and hardening and probably due to a favorable exchange of the cations and anions of the ingredients of the cementitious mixture, even quite considerable deviations from the "standard" formulation given in the examples have but a small influence on the mechanical strength properties of the final building material. Likewise variations in the amount of water used in the slurry have a slight effect only on said properties. While a minimum amount of water is necessary to initiate the reactions, addition of even a considerable excess of water does not impair the mechanical strength properties of the resulting building material too much.

It is also to be noted that the novel composition, when mixed in a given quantity with a given amount of water, yields a cream-like slurry which is more fluid than conventional cement-water slurries composed approximately of the same proportions of cementitious composition and water. As a result thereof the relative amount of filler material which can be added to the slurry can be increased considerably yielding a final product which is lighter and less expensive than similar slurries with conventional cements.

As an especially important advantage of the claimed composition there may be mentioned that test pieces obtained from a slurry of the composition mixed with sea water or with water contaminated, for instance, by algae also show excellent properties. Such slimy and impure water cannot be used for slurrying portland cement.

Building and construction materials made with the cement according to this invention when combined with organic filler materials are not hygroscopic, brittle or porous, will not burn, will not rot and will not be attacked by insects or rodents, in contrast to the organic filler itself.

Said building and construction materials owe the properties to the fact that each particle of the filler materials becomes saturated and coated with the slurry which possesses a high adhesive power toward organic fibers. Said adhesive power is preserved during setting and solidification of the slurry. As a result thereof the particles and fibers of the filler material are strengthened and reinforced by the substantially fluid-tight cement coating provided thereon by the treatment with the cement slurry.

By adding suitable pigments to the dry cement mixture an "inlaid" colored final product can be obtained.

Examples of organic filler materials which can be incorporated in the novel cement are, for instance, saw dust, wood shavings, wood chips, sugar cane residues, i.e. bagasse, crushed rushes and bamboo stalks, dry leaves, straw, hay, ground corn cobs and stalks, nut and seed shells, and other fibrous vegetable materials.

Examples of inorganic fillers which cannot be incorporated into portland cement slurries but can be admixed to the novel cement of the present invention are, of course, for instance, clay, top soil, unwashed gravel and unwashed sand. Of course, any other filler material which can be incorporated in portland cement slurries can be combined at least as well with the novel cement slurries with the additional advantage that the setting and hardening time is considerably reduced.

The novel cement thus permits easy and inexpensive manufacture of a great variety of articles such as boards, plates, panels, walls, wall panels, complete staircases, partitions and other small and large units to be used in the construction of prefabricated buildings.

Combination with various inorganic filler materials allows to manufacture strong unfired bricks, non-hygroscopic cement blocks, flag stones, complete side walks, etc. By mixing the slurry with earth and even top soil, it is possible to make side walks, driveways etc. without removing any such earth or top soil from the proposed location of the side walk, drive-way or the like. Only the cement and water need be transported.

The specific gravity of the novel cement combined with organic filler material as mentioned above may vary between 0.9 and 1.5 according to the nature and amount of the filler material employed.

Complete setting and hardening of filler material bound by the novel cement is achieved depending on local conditions between 3 days and 10 days, as compared to 28 days required for complete hardening of portland cement.

Another advantage of mixtures of the cement composition according to this invention with filler material is to be seen in the fact that, due to the exothermic reaction taking place on slurrying the cement, the molded articles can be stripped from the molds within a few hours.

Due to the formation of the $SiO_3$-anion during solidification of the novel cement it adheres very strongly to reinforcing fillers such as glass fiber and the like, whereby very strong and light molded bodies are obtained.

The following types of products may be manufactured among many others:

Mixing the novel cement slurry with saw dust and other organic filler material, yields products which are especially recommended for structural units useful in the interior of houses. According to the nature of the filler and proportion, the resistance of such products to compression is between about 3000 p.s.i. and about 4000 p.s.i. and the tension strength between about 600 p.s.i. and about 800 p.s.i.

The novel cement mixed with saw dust and sand produces a material of considerable hardness and is particularly recommended for floors and exterior walls of small buildings and outside panelings of large buildings.

By impregnating burlap or jute with the cement slurry according to this invention and using it as veneer on a panel made of vegetable material also impregnated with the slurry, a fire-proof building material can be manufactured which will advantageously replace plywood.

It has been found that vegetable, animal, and mineral oils and distillates do not cause damage to the set and hardened elements and structural units made with the novel cement of this invention. This is in contrast to elements and units manufactured with portland cement. In addition thereto, the wear resistance of the elements and units according to this invention, when exposed to such oils, shows a considerable improvement over elements and units according to this invention, when exposed to such oils, shows a considerable improvement over elements and units made with portland cement.

Floors made with the novel cement when wetted with water, oil, kerosene and other liquids, are much less slippery than conventional floors.

When the filler used with the novel cement is sand and gravel, the set and hardened product shows properties at least as good as those of similar products prepared with conventional cements, but the sand and gravel used with the novel cement may be contaminated by earth and clay and the purity of the slurrying water is not critical as in the case of portland cement.

Slurries of highly diluted consistency can be injected into the soil to stop disastrous land slides under railroads, dams, canals, buildings, and other critical engineering projects. Such injections considerably increase the safety in digging and drilling wells, mines quarries etc.

The novel cement slurry filled, for instance, with saw dust or the like produces a strong, elastic, and light material which can be cut by a lumber saw, drilled, and tapped for screws. Parts made of such or similar materials can be assembled by means of ordinary nails and wood screws.

The novel cement will adhere to conventional masonry and to wood. This property permits sealing a wooden frame into an opening in a brick, stone, or concrete wall and then nail or screw on to the frame any kind of window or door frame.

The following Table I illustrates several typical examples of the preparation of advantageous mixtures comprising the novel cement and various filler materials; these examples are, of course, not to be considered as limiting the scope of the application of the present invention. The amounts of the various ingredients are given in parts by weight.

TABLE I

| Example | Cement | Water | Filler | Type of Filler |
|---------|--------|-------|--------|----------------|
| 3 | 35-45 | 30-40 | 20-25 | Saw dust. |
| 4 | 35-40 | 25-30 | 20-30 | Straw or dry leaves. |
| 5 | 35-40 | 30-35 | 20-30 | Bagasse. |
| 6 | 35-45 | 30-35 | 20-30 | Seed and nut shells. |
| 7 | 20-25 | 15-20 | 60-70 | Dry soil. |
| 8 | 30-35 | 20-25 | 25-35 / 25-35 | Clay. / Slag, cinders. |
| 9 | 30-35 | 20-25 | 20-25 / 30-40 | Saw dust. / Sand, etc. |

The following Table II shows the results of comparative crushing tests performed on specimens prepared with conventional cements compared with specimens prepared with the novel cement. All percentages given are by weight. The p.s.i.-values indicate the load as read immediately before the specimen started to break. All tests were performed by preparing the specimens and incorporating the filler materials under equal conditions. The specimens were allowed to fully set and harden.

TABLE II

| Example | Composition | Strength, p.s.i. |
|---------|-------------|------------------|
| 10 | 30% portland cement and 70% soil | 50-60 |
| 11 | 30% portland cement, 40% saw dust, 30% water | Nil |
| 12 | 40% portland cement, 40% saw dust, 20% water | Nil |
| 13 | 30% novel cement, 40% saw dust, 30% water | 1,300 |
| 14 | 40% novel cement, 35% saw dust, 25% water | 4,000 |
| 15 | 22% novel cement and 78% soil | 3,000 |
| 16 | 33% novel cement and 67% soil | 4,500 |

NOTE.—Tests 11 and 12 showed no strength whatsoever; the sample could be crushed between the fingers.

Test specimens containing soil as filler were prepared by simply mixing the components and adding water till a "putty" consistency was attained. The molds were filled by hand, and no pressure was applied.

Test specimens containing saw dust fillers were prepared by mixing the ingredients and then submitting them to the action of a press in the mold. The pressure applied was about 100 p.s.i.

The heat resistance of the novel building material has been tested by prolonged exposure of specimens with organic filler to a temperature of 1000° F. No changes were observed. Thus this kind of building material can, to say the least, definitely be placed in the "non-flame-sustaining" class of building materials.

It is, of course, also possible to mix the components composing the cementitious preparation according to the present invention in a different manner than described in the preceding examples. For instance, it is possible to mix all five components, i.e. magnesuim oxide, magnesium sulfate, calcium chloride, sodium fluorosilicate, and sodium silicate in the required proportion. It is also possible to prepare first a mixture of 2 or 4 of the components and then admix thereto the other three or, respectively, one components in the required proportions. It is, of course, understood that the ingredients must be free of water and in a substantially anhydrous state.

Furthermore, it is understood that, in place of sodium fluorosilicate and/or sodium silicate, there may be used other alkali metal silicates and alkali metal-fluorosilicates, such as the corresponding potassium and lithium compounds.

Likewise, calcium chloride may be replaced by other alkaline earth metal chlorides, such as barium or strontium chloride.

The following further examples serve to illustrate certain modifications of cementitious compositions according to the present invention as claimed hereinafter. The parts of the components given in these examples are parts by weight. The first group of these examples refers to the manufacture of molded bodies of any desired shape whereby no substantial pressure is applied during molding.

Example 17

The following comminuted components are mixed:

| | Parts |
|---|---|
| Calcined magnesite | 25 |
| Calcined magnesium sulfate | 12 |
| Anhydrous calcium chloride | 10 |
| Dried sodium silicate | 8 |
| Dried sodium fluorosilicate | 2 |

The resulting cementitious composition which contains more of the components of the mixture A of Example 1 is especially suitable for binding organic fillers.

Example 18

The following components are intimately mixed with each other:

| | Parts |
|---|---|
| Magnesum oxide | 9 |
| Magnesium sulfate | 4 |
| Potassium silicate | 4 |
| Potassium fluorosilicate | 1 |

Thereafter, 3 parts of calcium chloride are intimately admixed thereto.

Example 19

The following components are intimately mixed with each other:

| | Parts |
|---|---|
| Magnesium oxide | 14 |
| Magnesium sulfate | 7 |
| Calcium chloride | 10 |
| Sodium silicate | 8 |
| Sodium fluorosilicate | 2 |

The resulting cementitious composition which contains less of the components of mixture A of Example 1 is especially suitable for binding inorganic fillers.

The following examples as given in Table III will describe the manufacture and the amounts of filler and water used for making various molded articles. The first group of these examples refers to the manufacture of molded bodies of any desired shape whereby no substantial pressure is applied during molding. The molded articles are obtained by slurrying the cement with water, admixing thereto the filler materials, and either pouring the fluid mixture into a mold or, for instance, if floors are produced, directly on the subfloor according to the methods known to the building art.

TABLE III

| Example | Cement Example | Cement Amount | Water Amount | Filler Type | Filler Amount | Use of Final Product |
|---------|---------|--------|--------|------|--------|---------------------|
| 20 | 16 | 10 | 10 | Saw Dust | 5 | Inside walls, staircases. |
| 21 | 19 | 10 | 8 | Saw Dust / Sand | 3 | Floors, inside walls. |
| 22 | 18 | 10 | 12 | Saw dust / Sand / Chopped straw | 2 / 5 / 1 | Do. |
| 23 | 1 | 10 | 8 | Sand / Chopped straw / Nut shells | 4 / 2 / 2 | Outside and inside walls. |
| 24 | 2 | 10 | 8 | Soil | 30 | Driveways. |

The examples given in Table IV will describe the manufacture of molded bodies and the amounts of filler and water used whereby the resulting slurry is placed into suitable molds and exposed therein to a pressure between about 1000 p.s.i. and 3000 p.s.i. The compressed bodies are removed from the mold as soon as they become self-supporting. This takes place within a few hours.

TABLE IV

| Example | Cement Example | Cement Amount | Water Amount | Filler Type | Filler Amount | Use of Final Product |
|---|---|---|---|---|---|---|
| 25 | 1 | 10 | 9 | Saw dust<br>Chopped straw<br>Burlap sheet | 3<br>2<br>1 | A layer of slurry with filler incorporated therein is covered on both sides with burlap soaked with the cement slurry and allowed to harden in a press under a pressure of 1,500 p.s.i. An incombustible plywood-like material results. |
| 26 | 17 | 10 | 7 | Saw dust<br>Burlap sheet | 5<br>1.5 | The procedure is the same as in Example 25. An incombustible plywood-like material is obtained. |
| 27 | 19 | 10 | 8 | Chopped straw<br>Red pigment<br>Shredded burlap fibers | 2<br>0.5<br>1.5 | The slurry with filler incorporated therein is filled into a mold and is subjected in the mold to a short-time pressure of 3,000 p.s.i. After the pressure is released, the molded article is allowed to harden. In this manner tiles, shingles, roof tiles and the like "cold" ceramics are obtained without heating. |
| 28 | 19 | 10 | 8 | Sand<br>Cinders | 25<br>10 | The procedure is the same as in Example 27 whereby substantially water-tight bricks and cement and cinder building blocks are obtained. |

EXAMPLE 29

A cementitious composition according to example 19 is slurried with twice its amount of water and is used for stabilizing moving soil, for instance, for reinforcing dunes, soil under sagging foundations, for excavation, in tunnel construction, in mining, petroleum wells, and others. The amount of water used for slurrying the cement depends, of course, upon the moisture content of the respective soil to be stabilized.

EXAMPLE 30

The cement is used as pigment for artistic coloring, for instance, by applying the slurry to walls, tiles and other articles made of the cement of this invention. For this purpose 10 parts of cement of Example 1 and between about 0.5 part and about 2 parts of the pigment are slurried with about 7 parts to about 12 parts of water and applied to the walls etc. to be painted.

EXAMPLE 31

A cementitious composition which has proved to be of considerable strength and is useful as building and construction material which is exposed to heavy loads, is prepared by mixing 100 parts of the composition of Example 19 with 80 parts of water, 250 parts of sand, 100 parts of ground cinder, and 5 parts of chopped fiber glass. Thin tiles, shingles, and the like "cold" ceramics are made from such a mixture as described in Example 28.

Of course, many changes and variations in the proportions of the cement ingredients, in the method of compounding them with each other and the various filler materials, in the amounts of filler material and slurrying water used, in the setting and hardening procedure, the pressure and temperature employed, in the manner of using the resulting hardened and set cement products, and the like may be made by those skilled in the art in accordance with the principles set forth therein and in the claims annexed hereto.

We claim:

1. A finely comminuted cementitious composition composed of an intimate mixture of a magnesium oxide-containing compound selected from the group consisting of magnesium oxide and semi-calcined dolomite, magnesium sulfate, an alkaline earth metal chloride, an alkali metal silicate, and an alkali metal fluorosilicate, said mixture reacting, on slurrying with water, to form a substantially water insoluble complex compound after setting and hardening, said composition being composed according to the following formulas:

(a) $$mMgO + nMgSO_4 + pXCl_2$$

and (b) $$qXCl_2 + rY_2SiO_3 + sY_2SiF_6$$

wherein X indicates an alkaline earth metal and Y indicates an alkali metal, the ratios in said composition of $m:n$ being between about 10:4 and about 10:9, of $m:p$ being between about 10:1 and about 10:3, of $q:r$ being between about 3:8 and about 1:8, of $r:s$ being between about 9:2 and about 7:2, and of $n:r$ being between about 1:1 and about 3:1.

2. A finely comminuted cementitious composition according to claim 1, wherein the alkaline earth metal chloride is calcium chloride, the alkali metal silicate is sodium silicate, and the alkali metal fluorosilicate is sodium fluorosilicate.

3. A substantially water-insoluble cementitious product composed of the substantially water insoluble complex compound of a magnesium oxide-containing compound selected from the group consisting of magnesium oxide and semi-calcined dolomite, magnesium sulfate, an alkaline earth metal chloride, an alkali metal silicate, and an alkali metal fluorosilicate set and hardened by the action of slurrying water, the amounts, in said product, of said components corresponding to the following formulas:

(a) $$mMgO + nMgSO_4 + pXCl_2$$

and (b) $$qXCl_2 + rY_2SiO_3 + sY_2SiF_6$$

wherein X indicates an alkaline earth metal and Y indicates an alkali metal, the ratios in said composition of $m:n$ being between about 10:4 and about 10:9, of $m:p$ being between 10:1 and about 10:3, of $q:r$ being between about 3:8 and about 1:8, of $r:s$ being between about 9:2 and about 7:2, and of $n:r$ being between about 1:1 and about 3:1.

4. A substantially water insoluble cementitious product according to claim 3, wherein the alkaline earth metal chloride is calcium chloride, the alkali metal silicate is sodium silicate, and the alkali metal fluorosilicate is sodium fluorosilicate.

5. The substantially water-insoluble cementitious product according to claim 3, having incorporated therein a filler material in an amount not substantially exceeding about four times the amount of the complex compound.

6. The substantially water-insoluble cementitious product according to claim 5, wherein the filler material is an organic filler material.

7. The substantially water-insoluble cementitious product according to claim 6, wherein the organic filler material is a fibrous organic filler material.

8. The substantially water-insoluble cementitious product according to claim 5, wherein the filler material is an inorganic filler material.

9. The substantially water-insoluble cementitious product according to claim 8, wherein the inorganic filler material is neutral calcium carbonate.

10. The substantially water-insoluble cementitious product according to claim 8, wherein the inorganic filler material is sand.

11. The substantially water-insoluble cementitious product according to claim 6, wherein the organic filler material is saw dust.

12. The substantially water-insoluble cementitious product according to claim 8, wherein the inorganic reinforcing filler material is glass fiber.

References Cited

UNITED STATES PATENTS

| | | | |
|---|---|---|---|
| 2,351,641 | 6/1944 | Sohl et al. | 106—106 |
| 2,995,454 | 8/1961 | Handl | 106—84 |

FOREIGN PATENTS 107,439    5/1939    Australia.

JAMES E. POER, Primary Examiner

U.S. Cl. X.R.

106—81, 84, 105, 106